United States Patent [19]

Guch, Jr.

[11] Patent Number: 4,839,902
[45] Date of Patent: Jun. 13, 1989

[54] LASER WITH CONTROLLED GEOMETRY FLUORESCENT CONVERTER

[75] Inventor: Steve Guch, Jr., Saratoga, Calif.

[73] Assignee: GTE Government Systems Corporation, Stamford, Conn.

[21] Appl. No.: 90,884

[22] Filed: Aug. 31, 1987

[51] Int. Cl.4 ............................................. H01S 3/091
[52] U.S. Cl. ................................. 372/70; 372/33; 372/72
[58] Field of Search ............... 372/33, 70, 72, 41, 372/66; 250/337, 483.1, 484.1, 487.1

[56] References Cited

U.S. PATENT DOCUMENTS

| | | | |
|---|---|---|---|
| 3,634,779 | 7/1969 | Crow | 372/70 |
| 4,262,206 | 4/1981 | Viehmann | 250/483.1 |
| 4,371,897 | 2/1983 | Kramer | 250/368 |
| 4,412,332 | 10/1983 | Knight et al. | 372/70 |
| 4,490,615 | 12/1984 | Riihimaki et al. | 250/487.1 |

OTHER PUBLICATIONS

Han et al; "A Spectrum Converter Dye for Enhancement of Blue-Green Laser Efficiency"; J. Appl. Phys. 60(10), Nov. 15, 1986; pp. 3414–3416.
Guch, Jr., "Parasitic Suppression in Large Aperture Disk Lasers Employing Liquid Edge Claddings"; Jun. 1976./vol. 15, No. 6/Applied Optics, pp. 1453–1457.

Primary Examiner—William L. Sikes
Assistant Examiner—B. Randolph
Attorney, Agent, or Firm—Douglas M. Gilbert; John F. Lawler

[57] ABSTRACT

The efficiency of an optically pumped solid state laser is substantially improved with a controlled geometry fluorescent converter between the pump light source and the lasing medium. Fluorescent materials have the capability of absorbing broadband pumping radiation, shifting it in wavelength and re-emitting it in the absorption band of the selected solid state laser medium. Use of angular formations having the converter surface facing the laser medium reduces fluorescent light trapping within the converter due to internal reflection thereby greatly increasing the total light output of the converter and thus the efficiency of the laser.

13 Claims, 3 Drawing Sheets

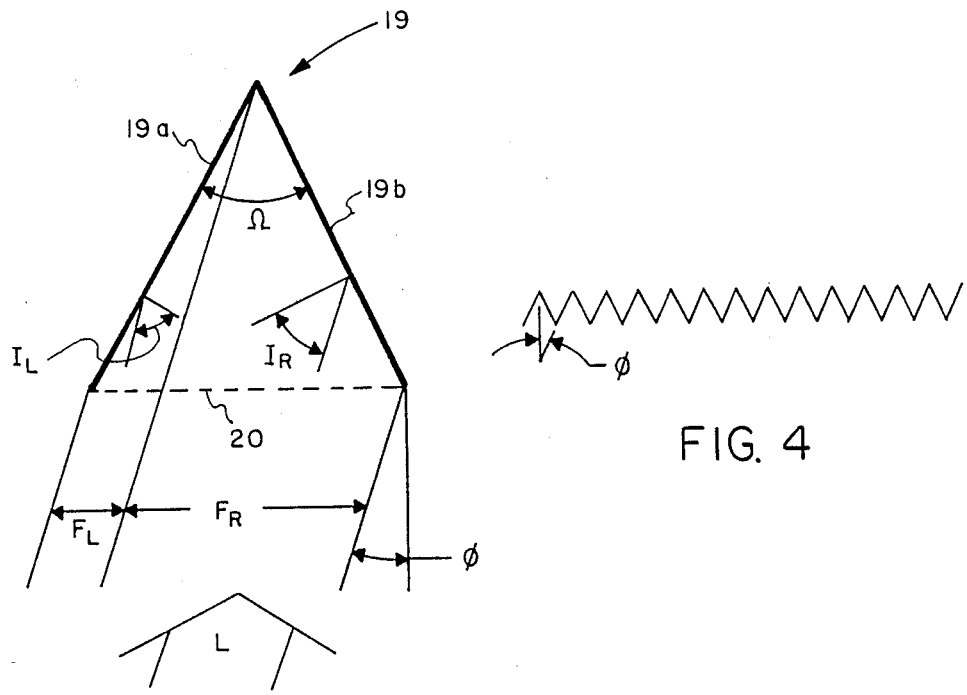
FIG. 3
FIG. 4
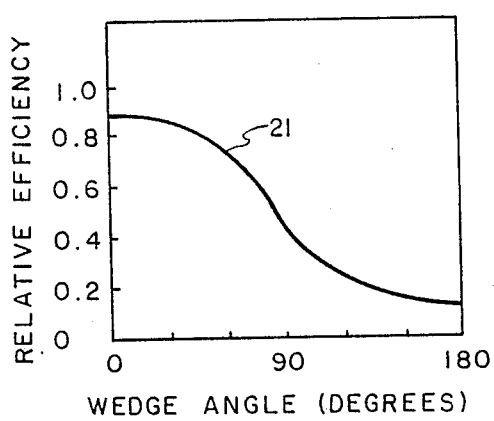
FIG. 6
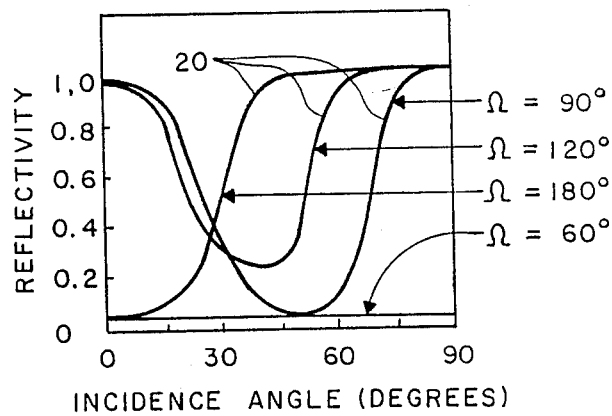
FIG. 5

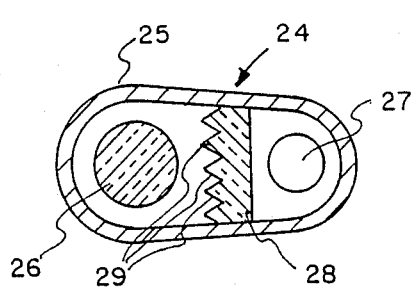
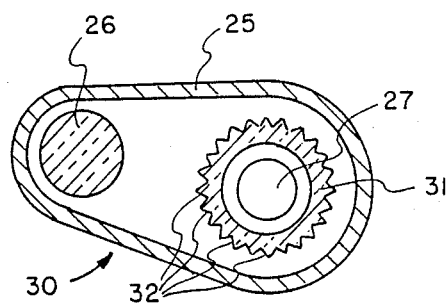
FIG. 7  FIG. 8
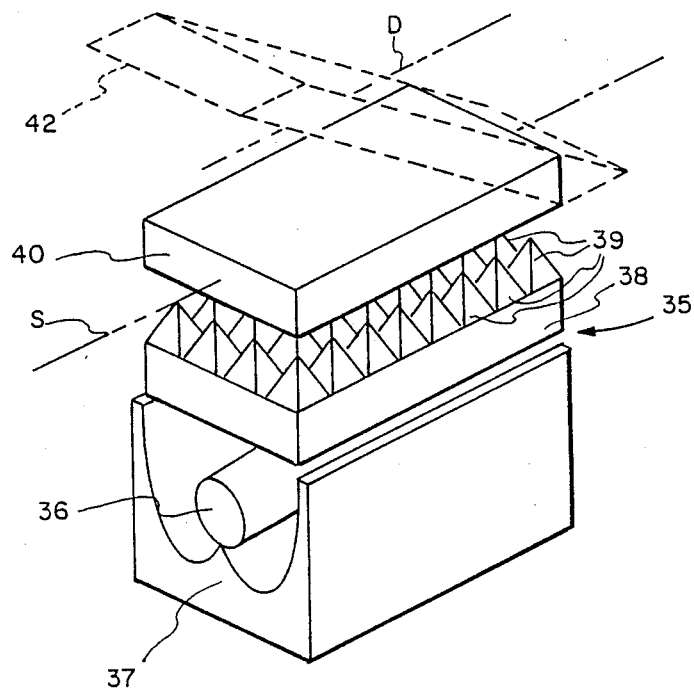
FIG. 9
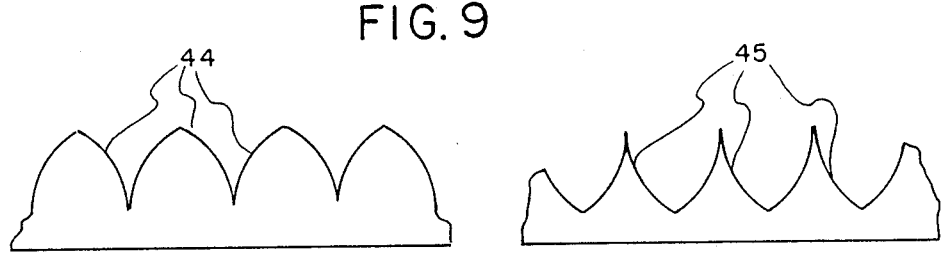
FIG. 10  FIG. 11

LASER WITH CONTROLLED GEOMETRY FLUORESCENT CONVERTER

BACKGROUND OF THE INVENTION

1. Field of the Invention

The present invention relates to lasers and more particularly to an improved optically-pumped solid state laser.

2. Description of the Prior Art

Many solid state lasers are directly pumped by flashlamps located in proximity to the lasing material. Since flashlamps radiate power across a broad spectral band, an attempt is usually made to match the emission and absorption wavelengths to maximize the overall laser excitation efficiency. Unfortunately, the number of available lamp and laser media that meet this criteria is so small that most lasers are severely restricted in their overall efficiency by pumping spectral mismatches.

Prior attempts to solve spectral mismatches have involved the use of fluorescent converters, which are selected so that the converter:

(1) transmits most or all of the flashlamp radiation which is directly within the absorption band of the laser host; and (2) absorbs a substantial portion of the flashlamp radiation which is outside the absorption band of the laser host. By molecular or atomic processes, fluorescent converters re-emit radiation (i.e., fluoresce) efficiently in a wavelength band which is within the absorption band of the laser host.

The only known example of the successful application of fluorescent conversion to date has been with liquid solutions of dyes within which the solid state laser medium is immersed. The significant benefits of this technique include a substantial enhancement of efficiency. For example, a flashlamp pumped neodymium yttrium aluminum garnet (Nd:YAG) laser and a Rhodamine 6G dye solution within its coolant experienced an increase in efficiency of approximately 30%. For a Ti:sapphire laser using a Coumarin dye solution, flashlamp pumped laser action was achieved at approximately 0.5% efficiency, (as compared to no lasing without the fluorescent converter). One disadvantage of this technique is short dye lifetime due to photochemical disassociation of the dye molecules with subsequent loss of absorption/fluorescence efficiency. Additionally, the difference between the refractive indices of the fluorescent material ($n=1.3$) and of the lasing medium ($n=1.8$) causes substantial Fresnel reflections at the surface, causing a loss of the isotropic fluorescent radiation due to re-absorption by the flashlamp.

This invention is directed to a flashlamp pumped solid-state laser which avoids these disadvantages.

OBJECTS AND SUMMARY OF THE INVENTION

A general object of the invention is the provision of a solid state laser system in which a substantial spectral match between the optical pump source and the laser medium is achieved.

A further object is the provision of such a laser with a solid state fluorescent converter capable of long term performance without photochemical deterioration.

A more specific object is the provision of such a fluorescent converter configured to minimize total internal reflection of pump light and fluorescent radiation thereby enhancing transmission of optical energy to the lasing medium.

These and other objects of the invention are achieved with a laser comprising a solid state fluorescent converter positioned between the pump source and the laser medium. The side of the converter facing the pump source is flat while the side facing the medium is configured with a plurality of formations at different angles relative to the flat side. The degree of the angle is selected to transmit a substantial portion of the fluorescent radiation toward the laser medium.

BRIEF DESCRIPTION OF THE DRAWINGS

For a better understanding of the invention as well as other objects and further features thereof, reference is made to the following description which is to be read in conjunction with the accompanying drawings wherein:

FIG. 3 is a greatly enlarged portion of FIG. 2 showing one of the facets.

FIG. 4 is a schematic view of a plurality of facets showing a typical angle of incidence of fluorescent radiation thereon.

FIGS. 5 and 6 are curves representing the variation of surface reflectivity and overall converter efficiency with changes in incidence and wedge angles, respectively.

FIGS. 7 and 8 are simplified transverse sections of two other embodiments of the invention utilizing a reflective enclosure for components of the laser system.

FIG. 9 is a perspective view of still other embodiments of the invention.

FIGS. 10 11 are schematic views of alternate shapes of the converter output surface formations embodying the invention.

DETAILED DESCRIPTION OF THE INVENTION

For a better understanding of the subject invention, reference is made to the following description and appended claims in conjunction with the above-described drawings.

Figure 1:
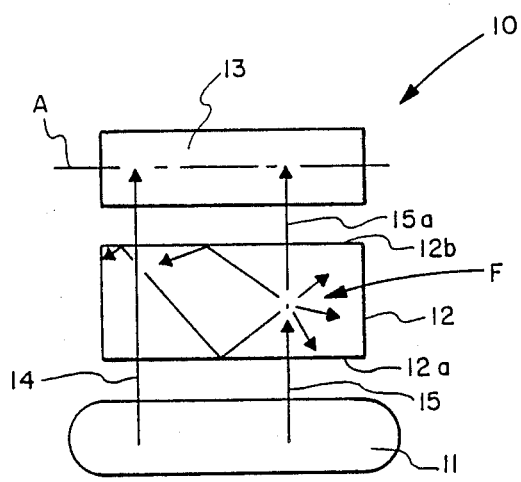
FIG. 1 is a schematic drawing of a laser showing a prior art fluorescent converter and its effect on fluorescent radiation.

Referring now to FIG. 1, depicted therein is a prior art laser system 10 comprising a pump light source 11, a fluorescent converter 12 and a lasing medium 13. By way of example, source 11 may be a flashlamp, converter 12 may comprise a Rhodamine 6G dye solution in a glass cell having plane input and output surfaces 12a and 12b, and laser medium 13 may be a Nd:YAG crystal which propagates a laser beam along axis A. The light output of source 11 consists of light that is within and outside of the spectral absorption band and the lasing medium 13. This is depicted diagrammatically in FIG. 1. Those wavelengths (14) that are within the absorption band of the laser are passed by converter 12 directly to medium 13. The other out-of-band portion 15 is absorbed by converter 12 at F, and is efficiently re-radiated at a different wavelength (i.e. fluoresces) by molecular or atomic processes as radiation output 15a which overlaps the spectral absorption band of medium 13. A principal drawback of this technique is the vulnerability of the converter dye solution to photochemical destruction by the flashlamp radiation, resulting in extremely short lifetime of the converter. A second disadvantage of this approach is that a substantial fraction of the isotropically emitted fluorescence is incident on the cell-air interfaces at angles such that total internal reflection (TIR) occurs. Unfortunately, most of the converted light bounces back and forth between the parallel dye cell faces and is trapped, thus preventing it from pumping the laser medium.

Figure 2:
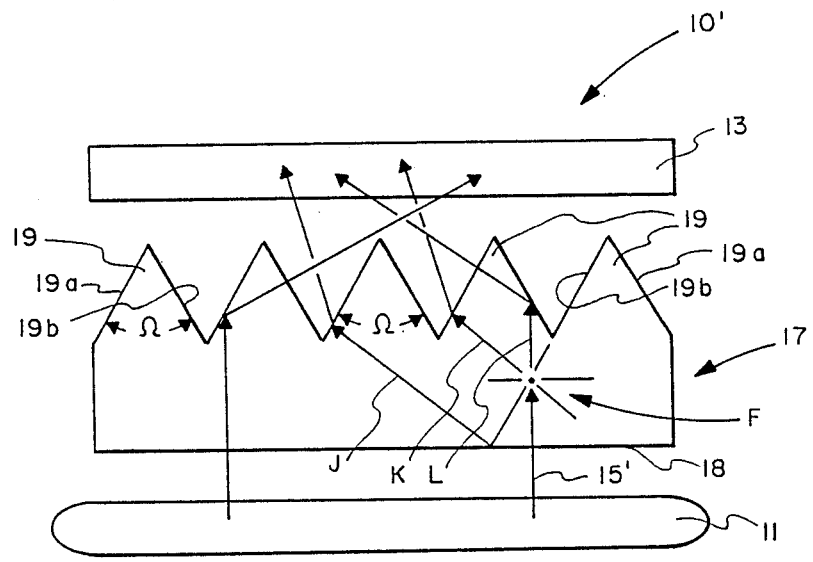
FIG. 2 is a drawing similar to FIG. 1 showing a fluoresence converter embodying this invention having an output side with a plurality of angular formations in the form of wedge-shaped facets.

Replacement of the liquid dye cell by a crystalline fluorescent medium (e.g., an ion-doped dielectric crystal) may eliminate the destruction of the fluorescence by ultraviolet flashlamp radiation. However, the high refractive indices of many fluorescent crystals (e.g., 1.7-1.9) will cause even more severe light trapping effects than occurred in the case of the dye fluorescent converter, since the critical angle for TIR is reduced for a high index medium. It would be especially desirable if the fluorescent material could be "joined" to the outside of the laser medium (as is possible if a dye solution is used as the laser rod collant) and even more desirable if the refractive indices of the laser and converter media were identical. This would be the effect of eliminating any fluorescent reflections from the surface nearest the laser rod, while trapping and redirecting radiation from the outer surface of the converter medium back toward the laser rod. Unfortunately, growth and processing of laser media does not permit meeting these goals, and a gap must be provided between the converter and laser media. In accordance with this invention, a laser 10' is depicted in FIG. 2 with a solid state fluorescent converter 17 between light source 11 and lasing medium 13; like reference characters indicate like parts on the drawings. The side of converter 17 facing source 11 is a plane surface 18 and the opposite side facing laser medium 13 comprises a plurality of angled or jagged formations 19, shown as wedges or wedge-shaped (saw tooth) projections, each defined by surfaces 19a and 19b that intersect at wedge angle $\Omega$ and extend in directions transversely of the plane of converter surface 18. Note that FIG. 2 is not shown to scale so as to illustrate certain aspects of the invention. A portion of the pump light 15' absorbed by converter 17 undergoes a wavelength shift and is re-radiated isotropically as indicated at F while still within the converter. Surface 18 preferably is polished and constitutes a solid-to-air interface. This provides effective total internal reflection of incidence angles greater than the so-called critical angle, for most of the radiation directed in the hemisphere oriented toward pump source 11 and indicated by the ray J. Surfaces 19a and 19b of wedges 19, on the other hand, control the angles of incidence of the isotropically emitted fluorescent radiation directed in the hemisphere toward medium 13 so that the latter radiation is transmitted from converter 17 to medium 13. This is illustrated by rays K and L in FIG. 2. In-band radiation, which is not isotropic but preferentially directed toward the laser medium, is reflected/refracted by the converter geometry, but is effectively transmitted.

In a properly designed converter, the angles of formations 19 are selected to minimize the number of angles beyond the critical angle for total internal reflection. Additionally, the selected geometry provides that most radiation greater than the critical angle is incident upon another surface at a non-critical angle, and so is outcoupled into lasing medium 13.

An analysis of the effectiveness of this improved structure based on the simplified geometry of an angled formation 19 provides insight into its effectiveness. Referring to FIGS. 3 and 4, the analysis utilized the two-dimensional wedge-shaped formation 19 having a base plane 20 and assumed an incidence angle of $\phi$ of fluorescent radiation L on base plane 20. As shown, a fraction $F_L$ of fluorescent light is incident on the left side 19a of the wedge at an incidence angle $I_L$, and the remaining fraction $F_R$ of fluorescent light is incident on the light side 19b of the wedge at an incidence angle $I_R$. In the analysis, $$R(\phi,\Omega)=F_L R_L+(1-F_L)R_R \tag{1}$$

where, $R(\phi,\Omega)=$ the total fluorescent reflectivity,
$R_L=$ the reflectivity of light incident on the left side of the wedge for the particular angle $I_L$,
$R_R=$ the reflectivity of light incident on the right side of the wedge for the particular angle $I_R$,
$F_L=0.5[\sin(\Omega-\phi)/\cos\phi \sin\Omega]$, and
$R_L$, $R_R$ are determined by Fresnel reflection laws.

For the multifaceted wedge surface of FIG. 4 in which the wedge angle is $\Omega$, $$R_{net}(\Omega)=\int_0^{\pi/2}d\phi R(\phi,\Omega)\sin\phi \tag{2}$$

where $R_{net}(\Omega)$ is the net surface reflectivity of fluorescent light.

In order to simplify calculations in the analysis, reflectivity for fluorescent rays striking the wedge surfaces was taken to have two values as a function of wavelength: less than an assumed critical angle for total internal reflection of 30 degrees, reflectivity was taken to be 0.05; greater than the critical angle, a value of 1.0 was used. While not exact, these assumptions allowed straightforward evaluation of the effectiveness of use of such angular formations 19. FIG. 5 shows curves 20 resulting from a plot of the reflectivity of the fluorescent converter with varying incidence and wedge angles, including both forward and backward, i.e., toward the flashlamp, fluorescence. Curves 20 are based on the semi-quantitative analytic method, and therefore, are indicative only of general results. Nevertheless, the analysis indicates that wedge angles from 30° to 90° result in substantial changes in the reflectivities experienced by fluorescence incident across the full range of incidence angles. Of particular significance is the fact that relatively sharply pointed surfaces ($\Omega \leq 60°$) offer substantially reduced reflectivity for incident isotropic fluorescence and are preferred in achieving the objects of the invention.

The results shown in FIG. 5 were applied semi-quantitatively to estimate the improvement in overall fluorescent converter efficiency as compared to a converter with flat parallel input and output sides (FIG. 1). The results of this analysis are shown in FIG. 6 and show that sharply pointed surfaces ($\Omega \leq 60\%$) can result in channelling of the fluorescence toward the laser medium, by effectively reducing the fraction of fluorescent rays incident above the critical angle. As with FIG. 5, FIG. 6 curve 21 is indicative only of general results. Nevertheless these curves demonstrate the effectiveness of the invention in enhancing the efficiency of fluorescent converters. Based on these results, it is estimated that the effectiveness of the fluorescent converter may be enhanced by a factor of 10 or more through practice of the invention.

FIG. 7 shows another embodiment of the invention in which laser 24 comprises an oblong hollow reflective envelope 25 containing a laser rod 26, a flashlamp 27 and a plate-type fluorescent converter 28 between rod 26 and flashlamp 27. The side of converter 28 facing rod 26 has a plurality of wedge-shaped formations 29 similar to those shown and described with reference to FIG. 2. By including the laser system components and the intermediate converter in reflective cavity 25, the efficiency of the system is substantially enhanced. By way of example, rod 26 may be made of titanium-doped sapphire, converter may be formed from a fluorescent crystal such as Ce:YAG, and lamp may be a short-current-pulse xenon flashlamp of 2–5 microsecond output duration.

FIG. 8 shows a laser 30 that is similar to laser 24 of FIG. 7 except that fluorescent converter 31 with wedge-shaped formations 32 on its outer surface is a cylinder and encloses flashlamp 27, like reference characters indicating like parts on the drawings. In laser 30, pump light within the laser rod absorption band passes with low loss through the cylindrical converter 31 and is absorbed by the active lasing media. The deep blue and ultraviolet content of the pump light, generated profusely in the hot, short-pulse plasma, is nearly completely absorbed by the fluorescent material and is emitted at nearly quantum efficiency, suffering loss only as a result of the energy mismatch between the absorbed and emitted wavelength photons. Fluorescent radiation emitted back toward lamp 27 is largely reflected back in the direction the laser rod 26. This, and the fluorescent radiation emitted toward rod 26, pass largely unimpeded through the angled converter surface and are absorbed by the laser rod. The efficiency of the system is substantially enhanced.

FIG. 9 depicts another embodiment of the invention in a slab laser 35 shown in solid lines. Laser 35 comprises a flashlamp 36 housed in a double-concave reflector unit 37, a fluorescent converter 38 having a plurality of pyramidal-shaped formations 39 projecting from the side remote from flashlamp 36. Lasing medium 40 is in the form of a flat parallel-sided slab. The axis of the laser beam generated by this laser is designated S. This embodiment is useful in another type of laser called a disc laser by substituting for slab 40 a disc 42 shown in broken lines and oriented at an upwardly inclined angle. The disc laser produces an output beam along axis D that is wider than the output beam of the slab laser. Converter 38 functions in the manner of the converters in the embodiments described above to provide substantially improved efficiency in the pumping of the lasing media.

While all the above described embodiments of the invention feature fluorescent converters with flat-sided angle formations on the output side, it should be understood that the invention may be practiced with converter formations having other shapes. For example, each jagged or angled formation may have the shape of an inverted cusp 44 as shown in FIG. 10, cusps 45 as shown in FIG. 11 or three-dimensional variations thereof. The invention thus comprehends a fluorescent converter having an output side with a plurality of surfaces extending in directions transversely of the opposite plane converter side and at angles thereto selected to transmit a substantial part of the fluorescent radiation toward the lasing medium. In addition, other modifications may be made to the teaching of the invention without departing from the true spirit and scope of the invention.

What is claimed is:

1. In a solid state laser having a laser gain medium and a light source with output light for optically pumping said medium, said medium having a predetermined pump light absorption band, the improvement of means for transmitting to said medium output light within said absorption band and for converting at least part of said output light having a wavelength outside said band into light having a wavelength within said band and transmitting said to same medium, comprising:

a solid state fluorescent converter between said source and said medium being capable of transmitting part of said output light within said band and of producing fluorescent radiation within said band in response to excitation by the out-of-band output light, said converter having a first plane side facing said source and a second side facing said medium, said second side comprising a plurality of surfaces extending in directions transversely of the plane of said first side and at angles thereto having magnitudes selected to transmit a substantial part of said fluorescent radiation toward said medium.

2. In a solid state laser having a laser gain medium and a flashlamp with output light for optically pumping said medium, said medium having a predetermined pump light absorption band, the improvement of means for transmitting to said medium output light within said absorption band and for converting at least part of said output light having a wavelength outside said band into light having a wavelength within said band and transmitting same to said medium, comprising:

a solid state fluorescent converter between said flashlamp and said medium and being capable of transmitting part of said output light within said band and of producing fluorescent radiation within said band in response to excitation by the out-of-band output light, said converter having a first plane side facing said flashlamp and a second side facing said medium, said second side comprising a plurality of formations, each of said formations being defined by surfaces extending in directions transversely of the plane of said first side and at angles thereto having magnitudes selected to transmit a substantial part of said fluorescent radiation toward said medium.

3. The laser according to claim 2 in which said formations comprise wedge-shaped projections, each of said projections having at least two plane surfaces intersecting each other at an acute angle $\Omega$ and diverging from each other in a direction toward said first surface, said angle having a magnitude selected to transmit said fluorescent radiation toward said medium.

4. The laser according to claim 3 in which said said angle $\Omega$ is greater than 10° and is less than 90°.

5. The laser according to claim 3 in which said converter comprises cerium-doped yttrium-aluminum-garnet.

6. The laser according to claim 2 in which said formations have the shapes of cusps.

7. The laser according to claim 2 in which said formations have the shapes of inverted cusps.

8. The laser according to claim 2 in which said formations are pyramid-shaped.

9. The laser according to claim 2 in combination with reflector means enclosing said flashlamp and said lasing medium and said fluorescent converter.

10. The laser according to claim 2 in which said flashlamp has a cylindrically-shaped outer surface, said converter comprising a tubular sleeve surrounding said flashlamp.

11. An optically pumped solid state laser device comprising:
    a resonant cavity;
    means for extracting energy from said cavity;
    a solid state lasing medium capable of being optically pumped over a band of wavelengths, said lasing medium disposed in said cavity;
    flashlamp means for producing optical radiation extending over a band of wavelengths exceeding that capable of pumping said lasing medium;
    fluorescent converter means intermediate between said lasing medium and said flashlamp means for transmitting to said medium optical radiation within said lasing wavelength band and for converting at least part of said radiation having wavelengths outside said lasing band into radiation having wavelengths within said band and transmitting same to said medium, said converter means having a structure capable of containing a suitable fluorescent material, said structure having a jagged surface adjacent said lasing medium for increasing the transmission of fluorescent radiation to said medium for said converter means, and said structure having a smooth surface adjacent said flashlamp means for reflecting fluorescent radiation from within said converter means.

12. A laser device as in claim 11 wherein said lasing medium further comprises a laser rod.

13. A laser device as in claim 12 wherein said flashlamp has a cylindrically-shaped outer surface coextensive in length with said rod and said converter comprising a tubular sleeve surrounding said flashlamp, the outer surface of said sleeve being jagged.

* * * * *